(12) United States Patent
Cheek et al.

(10) Patent No.: US 8,113,926 B1
(45) Date of Patent: Feb. 14, 2012

(54) METHOD FOR DECREASING SPASTIC WING ACTIVITY OF POULTRY DURING SLAUGHTER

(76) Inventors: Hollis Cheek, Kosciusko, MS (US); Bruno Cattaruzzi, Brescia (IT)

(*) Notice: Subject to any disclaimer, the term of this patent is extended or adjusted under 35 U.S.C. 154(b) by 0 days.

(21) Appl. No.: 12/903,755

(22) Filed: Oct. 13, 2010

(51) Int. Cl.
    *A22B 3/06* (2006.01)
(52) U.S. Cl. .................................................. 452/66
(58) Field of Classification Search .......... 452/53, 452/54, 57, 66, 173
    See application file for complete search history.

(56) References Cited

U.S. PATENT DOCUMENTS

| | | | | |
|---|---|---|---|---|
| 4,829,635 A | * | 5/1989 | Tonnies | 452/57 |
| 5,487,699 A | * | 1/1996 | Tyrrell et al. | 452/66 |
| 5,643,072 A | * | 7/1997 | Lankhaar et al. | 452/66 |
| 6,126,534 A | * | 10/2000 | Jacobs et al. | 452/66 |
| 6,135,872 A | * | 10/2000 | Freeland et al. | 452/66 |
| 7,097,552 B2 | * | 8/2006 | Ovesen et al. | 452/66 |
| 7,331,848 B2 | * | 2/2008 | Zachariassen et al. | 452/66 |
| 7,377,844 B2 | * | 5/2008 | Kildegaard | 452/66 |
| 7,435,166 B2 | * | 10/2008 | Benson et al. | 452/173 |
| 7,438,637 B2 | * | 10/2008 | Zachariassen et al. | 452/66 |
| 7,662,030 B2 | * | 2/2010 | Cheek et al. | 452/57 |

* cited by examiner

*Primary Examiner* — Richard Price, Jr.
(74) *Attorney, Agent, or Firm* — Armstrong Teasdale LLP

(57) ABSTRACT

The present disclosure generally relates to a method for humanely stunning and slaughtering poultry, and more particularly to a method for decreasing the spastic wing activity of poultry during slaughter. In particular, the birds are placed into a sealed chamber and the pressure in the chamber is reduced at a continuous rate to a target decompression pressure. The low atmospheric pressure slaughter is more humane than traditional slaughter techniques and results in less spastic wing activity.

19 Claims, 5 Drawing Sheets

METHOD FOR DECREASING SPASTIC WING ACTIVITY OF POULTRY DURING SLAUGHTER

BACKGROUND OF THE DISCLOSURE

The present disclosure generally relates to a method for humanely stunning and slaughtering poultry, and more particularly to a method for decreasing the spastic wing activity of poultry during slaughter. In particular, the birds are placed into a sealed chamber and the pressure in the chamber is reduced at a continuous rate to a target decompression pressure. Once the target decompression pressure is established, the rate of pressure reduction is gradually decreased for a period of time until the poultry achieves a state of death. The low atmospheric pressure slaughter disclosed herein is more humane than traditional slaughter techniques and results in less spastic wing activity.

In the poultry-processing industry, poultry, such as hens, chickens, turkeys and the like, is processed in slaughterhouses into products intended for human consumption. Before the birds can be processed, they must first be stunned and then killed. The stunning of the birds may be achieved, for example, by exposing the birds briefly to an electric voltage or by placing the poultry in a room containing a stun gas. The stunning, either by means of an electric voltage or in some other manner, renders the birds unconscious or semi-conscious, so that the birds will not struggle to free themselves during further processing and will not be conscious at the time of death. Once stunned, the poultry is typically slaughtered by cutting the neck, so that the poultry will bleed to death. Alternately, the poultry may be re-exposed to an electric voltage, and electrocuted.

At present, most birds are stunned by electrical shock. This method is generally reliable and safe. However, prior to stunning, the birds' legs are placed in shackles forcing them to remain in an upside-down position as they are stunned. This position raises the blood corticosterone, a hormone integral to the general well being of birds, indicating increased stress levels. Furthermore, the birds may struggle prior to being shocked, which can result in broken wings and other damage to the poultry, thereby reducing the value of meat obtained from the poultry, and also increasing the extent of suffering of the birds.

Gas stunning typically involves the introduction of gasses such as carbon dioxide plus other gases, including argon, nitrogen, and oxygen into a closed chamber. However, use of these gases may be dangerous to humans, can require excessively long exposure times, and often results in grand mal seizures in the birds, suggestive of extreme pain. In addition, in the event of plant shutdown during the gas stunning process, the birds in the chamber cannot be removed until the gases are safely exhausted, and any birds that are not yet dead may revive and will suffer greater stress.

Attempts have also been made to stun or slaughter animals using changes in pressure. For example, U.S. Pat. No. 4,829,635 to Tonnies discloses a method for stunning animals such as pigs before slaughter. The animal is enclosed in a chamber that is first evacuated to an intermediate pressure that is well below atmospheric pressure, until the animal loses consciousness but not reflexes. The chamber is then evacuated again to a low pressure well below the intermediate pressure, and the low pressure is maintained until the animal is without reflexes, but heart function remains.

U.S. Pat. No. 2,588,770 to Sadler discloses an apparatus and method for stunning or killing animals. The process involves a two step pressure drop, first to a pressure low enough to cause sleepiness or unconsciousness, and then to a lower air pressure which is sufficient to kill.

However, none of the methods used in the prior art take into consideration the effects of particular pressure levels and the time of pressure decrease on the humanity of the stun/slaughter process, and physiological behavior of the poultry, such as spastic wing activity, or the effects of these variables on meat quality. There is thus a need for a more humane method of stunning and slaughtering animals, and in particular poultry, that also results in less broken wings, and thus, an improved meat quality.

SUMMARY OF THE DISCLOSURE

The present disclosure generally relates to a method for humanely stunning and slaughtering poultry, and more particularly to a method for decreasing spastic wing activity during the slaughter of poultry using a low atmospheric pressure system. In particular, the birds are placed into a sealed chamber and the pressure in the chamber is reduced at a continuous rate to a target decompression pressure. The low atmospheric pressure slaughter described herein is more humane than traditional slaughter techniques, reduces the amount of spastic wing activity during the slaughter as compared to other slaughter techniques, and thus, results in improved meat quality.

Thus, in one aspect, the present disclosure is directed to a method for decreasing the spastic wing activity during the slaughter of the poultry. The method comprises enclosing the poultry in a sealed chamber and decompressing the chamber at a continuous rate to a target decompression pressure of from about 23.5 inHg gauge pressure to about 27 inHg gauge pressure as measured at mean sea level. The lapse time to a decompression pressure of about 20 inHg gauge pressure is about 85 seconds or less, and over a decompression pressure range of from about 20 inHg gauge pressure to about 23.5 inHg gauge pressure, pressure in the chamber decreases at a rate of from about 0.5 inHg gauge pressure/15 seconds to about 0.5 inHg gauge pressure/45 seconds.

In another aspect, the present disclosure is directed to a method for decreasing the spastic wing activity during the slaughter of the poultry. The method comprises enclosing the poultry in a sealed chamber and decompressing the chamber at a continuous rate to a target decompression pressure of from about 23.5 inHg gauge pressure to about 27 inHg gauge pressure as measured at mean sea level. The lapse time to a decompression pressure of about 20 inHg gauge pressure is from about 70 seconds to about 85 seconds, the lapse time to a decompression pressure of about 21 inHg gauge pressure is from about 110 seconds to about 135 seconds, the lapse time to a decompression pressure of about 22 inHg gauge pressure is from about 165 seconds to about 185 seconds, the lapse time to a decompression pressure of about 23 inHg gauge pressure is from about 220 seconds to about 250 seconds, and the lapse time to a decompression pressure of about 23.5 inHg gauge pressure is from about 255 seconds to about 275 seconds.

Other objects and features of this invention will be in part apparent and in part pointed out hereinafter.

DETAILED DESCRIPTION OF THE DISCLOSURE

Figure 1:
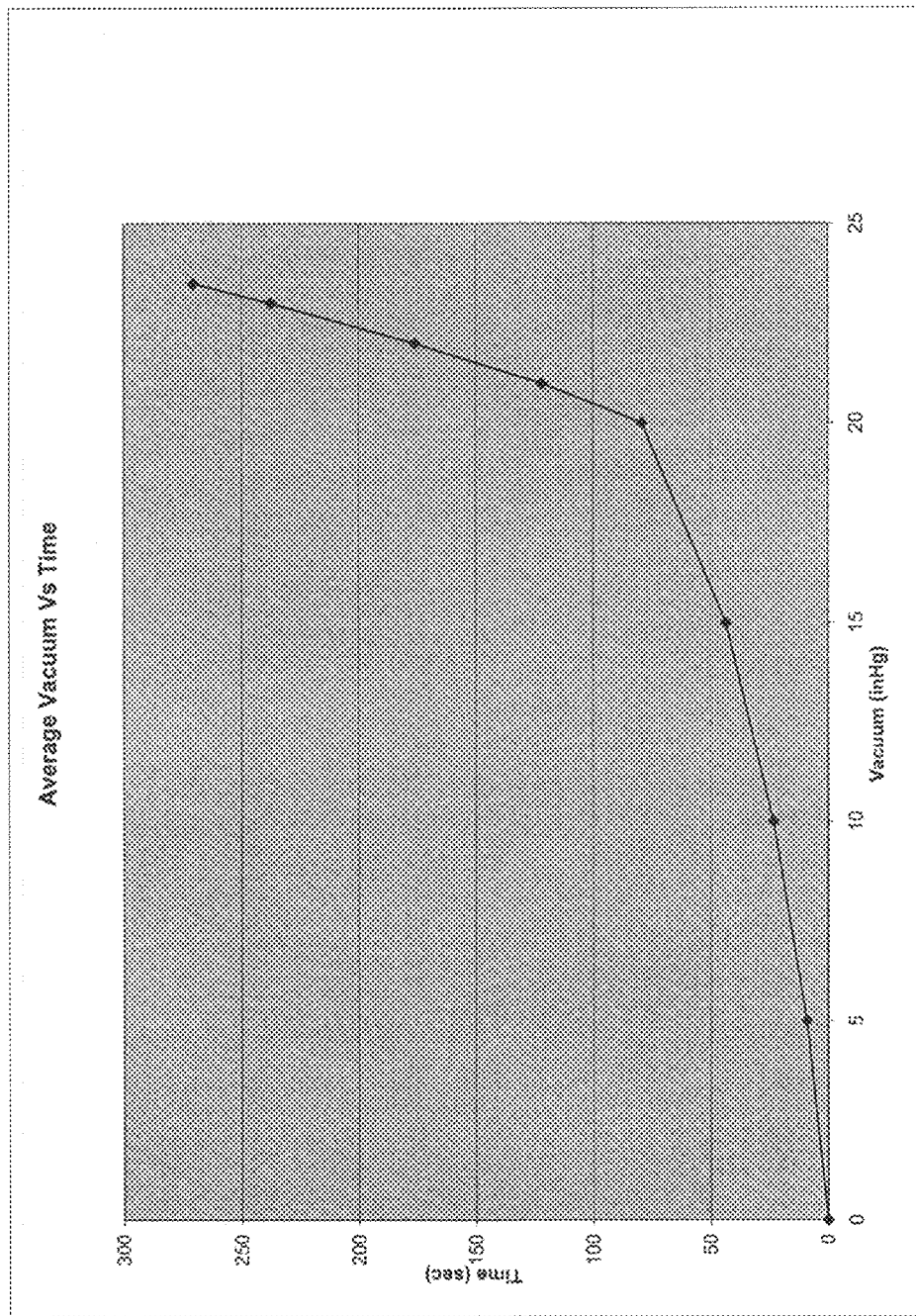
FIG. 1 is a chart depicting the average vacuum pressure versus lapse time for the low atmospheric pressure slaughter, as discussed in Example 1.

The present disclosure generally relates to a method for humanely stunning and slaughtering poultry while reducing the amount of spastic wing activity during slaughter, and more particularly to a method for stunning and slaughtering poultry using a low atmospheric pressure system. In particular, the birds are placed into a sealed chamber and the pressure in the chamber is reduced at a continuous rate to a target decompression pressure. Once the target decompression pressure is established, the rate of pressure reduction is gradually decreased until a state of death is obtained. The rate of decompression over a decompression pressure range of from about 20 inHg gauge pressure to about 23.5 inHg gauge pressure is controlled in order to reduce the amount of spastic wing activity during the slaughter, resulting in excellent meat quality.

It has now been discovered that poultry may be stunned and slaughtered using a low atmospheric pressure system (LAPS). The system described herein is more humane than prior known stunning/slaughter techniques, such as electrical stunning followed by exsanguination, gas stun/slaughter, or previously attempted pressure slaughter methods, and also results in a reduced amount of spastic wing activity during slaughter, resulting in an improved quality of meat, i.e., less broken wings and bruising.

In particular, the method comprises enclosing the poultry in a sealed chamber, decompressing the chamber at a continuous rate to a decompression pressure of from about 23.5 inHg gauge pressure to about 27 inHg gauge pressure, as measured at mean sea level. Once the target decompression pressure is established, the rate of pressure reduction is gradually decreased until the poultry achieves a state of death. Specifically, the lapse time to a decompression pressure of about 20 inHg gauge pressure is about 85 seconds or less, and over a decompression pressure range of from about 20 inHg gauge pressure to about 23.5 inHg gauge pressure, the pressure in the chamber decreases at a rate of from about 0.5 inHg gauge pressure/15 seconds to about 0.5 inHg gauge pressure/45 seconds. Advantageously, this method results in the birds experiencing about a 90% or more reduction in brain wave activity prior to ataxia, heart fibrillation, and death. As a result, the birds are rendered unconscious and, unlike other traditional stun/slaughter techniques, are unaware of impending death. Additionally, the low atmospheric pressure method described herein is an efficient means for stunning/slaughtering poultry. In particular, the poultry typically achieve a state of death within about five minutes or less after being enclosed in the sealed chamber. Further, as the poultry experience less spastic wing activity during the slaughter, this method results in less broken wings, and thus, an improved meat quality as compared to other slaughter methods. Specifically, as poultry do not have diaphragms, they cannot hold their breath, and as the pressure changes, the bird cannot inhale as much oxygen. As such, the birds need to use the oxygen stored in their air sacs. The dual reduction in oxygen in the bloodstream deprives the muscles of energy needed for movement, and consequently, the birds experience less stress and struggling, such as spastic wing activity, during the slaughter process.

More particularly, decompression creates a vacuum in the sealed chamber, which forces oxygen out of the birds' lungs. At the onset of unconsciousness, the birds experience ataxia, i.e., loss of posture (LOP), resulting in the birds being unable to maintain a standing position, and having no neck tension. Upon ataxia, the birds exhibit a tonic seizure, with wings extended and the tips of the wings crossed on the distal extremities. This is known as spastic wing activity or the "death struggle." Because the birds have been rendered unconscious (i.e., about 90% or more of the brain wave activity of the bird has ceased) prior to ataxia, the birds are unaware of their impending death and do not suffer during the seizures.

Without wishing to be bound by any particular theory, it is believed that during ataxia, cells obtain their energy through the process of anaerobic metabolism. Because neurons have only a minimal reserve of glycogen, the brain itself is not capable of much anaerobic metabolism. Furthermore, the metabolic rate of neurons is much higher than other tissues and, as a result, glucose is continuously being metabolized and storage simply does not occur. Additionally, storage of oxygen in neurons is very minimal. Thus, most neuronal activity depends on second-to-second delivery of glucose and oxygen from the blood. The sudden cessation of blood flow to the brain or sudden rapid decrease in oxygen in the blood resulting from the vacuum created upon decompression results in unconsciousness in the birds.

As noted above, prior to decompression, the birds are enclosed in a sealed chamber. Any suitable decompression chamber known in the art or commercially available may be used to perform the methods described herein, such as those described in U.S. Pat. Nos. 2,588,770 and 3,548,447, herein incorporated by reference in their entirety. One example of a suitable decompression chamber is described in the Test Methods section of the Examples. In one particular aspect, a suitable chamber is the chamber described in U.S. Patent Application Publication No. 2006/0009142 A1, herein incorporated by reference in its entirety.

The target decompression pressure needed to achieve a humane stun/slaughter may vary depending on a variety of factors, such as type of poultry, the time it takes to reach the decompression pressure (referred to herein as "lapse time"), the length of time the decompression pressure is maintained (referred to herein as "hold time"), and altitude at which the stun/slaughter occurs. Typically, however, the target decompression pressure will be from about 23.5 inHg to about 27 inHg gauge pressure, more typically from about 23.5 inHg to about 25 inHg gauge pressure, and more typically will be about 23.5 inHg gauge pressure.

It should be understood that unless otherwise indicated, pressure values are given herein in inches of mercury (inHg) gauge pressure under vacuum. Thus 25 inHg, as referred to herein, would be an absolute pressure of about 4.92 inHg (assuming atmospheric pressure of 29.92 inHg), or about 16.599 kPa absolute pressure. Additionally, for purposes of the present disclosure, pressure values given herein refer to pressures as measured at mean sea level. It is to be understood, however, that pressures may vary slightly depending on the altitude at which they are measured. As such, it is intended for the pressures given herein to encompass corresponding pressures as measured at different altitudes.

Alternately, the degree of decompression can be expressed as a percent of the atmospheric pressure at which the poultry normally live present in the decompression chamber following decompression. For instance, if the atmospheric pressure is 29.92 inHg, a decompression pressure of 25 inHg gauge would be 16.44% of atmospheric. Preferably, the decompression pressure is from about 9% to about 30% of atmospheric, and more preferably is from about 16% to about 22% atmospheric.

Preferably, the pressure in the chamber is lowered at a continuous rate to the target decompression pressure. As used herein, "continuous rate" means the rate of pressure drop is generally and substantially uninterrupted and steady; that is, the rate of pressure drop is generally a straight line pressure draw down without significant individual pressure stages. It has now been discovered that controlling the rate of decompression over a certain decompression pressure range results in decreased levels of spastic wing activity in the poultry. Specifically, in one preferred embodiment, over a decompression pressure range of from about 20 inHg gauge pressure to about 23.5 inHg gauge pressure, the pressure in the chamber decreases at a rate of from about 0.5 inHg gauge pressure/15 seconds to about 0.5 inHg gauge pressure/45 seconds, and more preferably from about 0.5 inHg gauge pressure/20 seconds to about 0.5 inHg gauge pressure/35 seconds, or from about 0.5 inHg gauge pressure/25 seconds to about 0.5 inHg gauge pressure/28 seconds. Advantageously, decreasing the pressure at these rates results in less spastic wing activity during slaughter and thus a more humane slaughter and better meat quality. Specifically, the time period over which the spastic wing activity occurs is greatly reduced as compared to other slaughter methods. In particular, by using the methods described herein, the spastic wing activity will only occur for about 10% or less of the total lapse time from the initial decrease in pressure to target decompression pressure.

In addition to the target decompression pressure and decompression pressure rates, the time it takes to reach various decompression pressures (i.e., the lapse time) may affect the quality of the slaughter. For instance, quick decompressions (i.e., short overall lapse times) may result in some birds reviving prior to death, while slower decompressions (i.e., long overall lapse times) may result in more wing flapping, wing damage, longer periods of consciousness, and more awareness of the environment and pain prior to death. Typically, however, the total lapse time to a target decompression pressure of from about 23.5 inHg gauge pressure to about 27 inHg gauge pressure is from about 100 seconds to about 715 seconds. In one embodiment, the lapse time may be from about 210 seconds to about 715 seconds; or from about 290 seconds to about 715 seconds; or from about 210 seconds to about 630 seconds. In another embodiment, the lapse time may be from about 100 seconds to about 400 seconds; or from about 185 seconds to about 400 seconds; or from about 100 seconds to about 315 seconds. In another embodiment, the lapse time may be from about 150 seconds to about 535 seconds; or from about 230 seconds to about 535 seconds; or from about 150 seconds to about 450 seconds.

More specifically, the lapse times to decompression pressures of from about 20 inHg gauge pressure to about 23.5 inHg gauge pressure may affect the amount of spastic wing activity and broken wings of the poultry during slaughter, and thus, may affect the humanity of slaughter, as well as the quality of the meat obtained. In one embodiment, the lapse time to a decompression pressure of about 20 inHg gauge pressure may be about 85 seconds or less, more particularly from about 70 seconds to about 85 seconds, and more particularly from about 79 seconds to about 83 seconds. The lapse time to a decompression pressure of about 21 inHg gauge pressure may be from about 110 to about 135 seconds, and more particularly from about 131 seconds to about 135 seconds. The lapse time to a decompression pressure of about 22 inHg gauge pressure may be from about 165 seconds to about 185 seconds, more particularly from about 180 seconds to about 185 seconds, and more particularly is about 181 seconds. The lapse time to a decompression pressure of about 23 inHg gauge pressure may be from about 220 seconds to about 250 seconds, more particularly from about 230 seconds to about 240 seconds, and more particularly is about 235 seconds. The lapse time to a decompression pressure of about 23.5 inHg gauge pressure may be from about 255 seconds to about 275 seconds, and more particularly from about 259 seconds to about 269 seconds. In another embodiment, the lapse time to the decompression pressure of about 20 inHg gauge pressure is about 79 seconds; the lapse time to the decompression pressure of about 21 inHg is about 122 seconds; the lapse time to the decompression pressure of about 22 inHg is about 176 seconds; the lapse time to the decompression pressure of about 23 inHg is about 238 seconds; and the lapse time to the decompression pressure of about 23.5 inHg is about 271 seconds.

It should be recognized that the lapse times provided herein are for stun/slaughters performed at mean sea level. However, lapse time may vary depending on the altitude at which the slaughter is being performed. For instance, the time it takes to reach the target decompression pressure will be somewhat shorter with increase in altitude. In general, the altitude adjustment for lapse time may be calculated by subtracting one second from the lapse time for each one thousand feet increase in altitude.

By decreasing the pressure in the chamber at the rates and lapse times described herein, the amount of spastic wing activity of the poultry can be significantly reduced as compared to other slaughter methods. Specifically, spastic wing activity of the poultry typically occurs at a decompression pressure of from about 20 inHg gauge pressure to about 23.5 inHg gauge pressure. It has been discovered that if the pressure in the chamber is decreased according to the rates and lapse times described herein, the spastic wing activity of the poultry only occurs over a period of time that is about 10% of the total lapse time of the slaughter. For example, for a slaughter having a total lapse time of about 125 seconds from the initial decrease in pressure in the chamber until the target decompression pressure is reached, spastic wing activity will occur only for a period of about 12.5 seconds at decompression pressures of from about 20 inHg gauge pressure to about 23.5 inHg gauge pressure.

In one embodiment, once a target decompression pressure is reached, the decompression pressure is maintained for a period of time (i.e., the hold time) until the poultry achieve a state of death. In another embodiment, once a target decompression pressure is established, the rate of pressure reduction is gradually decreased until the poultry achieve a state of death. For example, in one embodiment, once a target decompression pressure is established, the rate of pressure reduction is slowed until a final target decompression pressure is established. During this gradual decrease in the rate of decompression, the poultry achieve a state of death. As used herein, the term "state of death" is intended to refer to the point at which all vital signs of the poultry cease, and there is a lack of response to stimuli that produce predictable responses. The hold time is not critical to achieve a humane slaughter of the poultry, and in one embodiment, the poultry may achieve a state of death with no hold time.

As noted above, the low atmospheric pressure system described herein advantageously results in a more humane slaughter as compared to currently available slaughter methods, such as electrical stunning followed by exsanguination and gas stunning/slaughter. In particular, the pressure decrease renders the birds unconscious prior to heart fibrillation and occurrence of ataxia. It has been previously demonstrated that on average, a flat line electroencephalogram (EEG) occurs at about a 90% reduction in signal, and that at this point, consciousness has been lost. See, Raj, et al., "Changes in the somatosensory evoked potentials and spontaneous electroencephalogram of broiler chickens during exposure to gas mixtures," Br. Poult. Sci., 1998, Vol. 39, pp. 686-695 and Raj, et al., "Changes in the somatosensory evoked potentials and spontaneous electroencephalogram of hens during stunning in argon-induced anoxia," 1992, Br. Vet. J., Vol. 147, pp. 322-330. Thus, subsequent to the point at which about 90% or more of the brain wave activity of the poultry ceases, the birds are unconscious and not aware of physiological stress or environment, and thus do not recognize impending death.

Typically, cessation of about 90% or more brain wave activity is achieved after decompression to a pressure of from about 18 inHg to about 22 inHg, and more typically to about 20 inHg. It should be understood that the time following the start of decompression that it takes to reach a 90% or more loss of brain wave activity may vary depending on the target decompression pressure and/or lapse time. For example, the time to unconsciousness would be quicker for a method using a target decompression pressure of 27 inHg and a lapse time of 400 seconds, than it would be for a method using a target decompression pressure of 23.5 inHg and a lapse time of 400 seconds. Likewise, the time to unconsciousness would be quicker for a method using a target decompression pressure of 23.5 inHg and a lapse time of 350 seconds than it would be for a method using a target decompression pressure of 23.5 inHg and a lapse time of 400 seconds.

The birds will experience ataxia, i.e., loss of posture (LOP), followed by heart fibrillation, shortly thereafter. In particular, upon ataxia, the birds are unable to maintain a standing position, and lose all neck tension. During ataxia, the birds may exhibit a tonic seizure, with wings extended and the tips of the wings crossed on the distal extremities (i.e., spastic wing activity). Ataxia typically occurs within about 85 seconds or less after the start of decompression, more typically about 20 seconds to about 65 seconds after the start of decompression, more typically about 25 seconds to about 55 seconds after the start of decompression, and about 1 to 4 seconds before complete heart fibrillation, i.e., fibrillation of both the atria and ventricles, indicating that death is imminent. Like discussed above for achieving a 90% or more loss of brain wave activity, it should be understood that the time following the start of decompression that it takes to reach ataxia and the time following the start of decompression that it takes to achieve complete fibrillation may vary depending on the target decompression pressure and/or lapse time. Ataxia may occur during and/or prior to the occurrence of spastic wing activity.

As noted above, the stunning and slaughtering of poultry using the low atmospheric pressure method described herein advantageously is more humane than currently known slaughter techniques, such as electrical stunning followed by exsanguination, and results in improved meat quality. Specifically, the reduced spastic wing activity indicates that there is less struggle for the poultry during slaughter, and thus, that the slaughter is more humane. Further, because the methods disclosed herein result in less spastic wing activity than previously known methods, the birds have fewer broken wings and bruising following slaughter, resulting in better meat quality.

The methods of the present disclosure may be adapted for use on any type of poultry including, but not limited to, chickens, turkeys, quail, geese, ducks, ratites, and combinations thereof. In one preferred embodiment, the poultry is chicken.

While the disclosure has been described in terms of various specific embodiments, those skilled in the art will recognize that the disclosure can be practiced with modification within the spirit and scope of the claims.

The present invention is illustrated by the following examples which are merely for the purpose of illustration and are not to be regarded as limiting the scope of the disclosure or manner in which it may be practiced.

EXAMPLES

Test Methods

Decompression chamber: The decompression chamber used in Examples 1, 2, and 3 comprised a commercial size chamber measuring 7 feet in diameter and 10 feet in length and having a volume of 400 cubic feet. The chamber was equipped with a gravity roller bed, which allowed for insertion and retrieval of a standard poultry transport cage. The chamber doors were designed and built to facilitate closure and sealing on each end of the chamber. Low atmospheric pressure was achieved by means of a series of vacuum rated butterfly valves employed for vacuum application and release and using three vane type vacuum pumps (Becker, Model U4.630, Becker Pump Corp., Cuyahoga Falls, Ohio). Each vacuum pump rated at 400 cubic feet per minute.

Pressures: Unless otherwise indicated, pressure levels given in the following examples are in inches of mercury (inHg) gauge pressure under vacuum.

Example 1

Bird Behavior During Slaughter

The behavior of birds during slaughter can be used to evaluate the quality of the stun and slaughter processes. In this example, the behavior of birds slaughtered using a low atmospheric pressure curve according to the instant disclosure was evaluated.

A closed circuit video camera (Observer Model VC-74-D, Observer, LLD., Taipei, Taiwan) was mounted inside of a decompression chamber as described in the Test Methods section, and focused on a pen housing 210 broilers that had been loaded into a standard live-haul cage. The cage was placed in the decompression chamber, the camera was activated as decompression was initiated, and the video feed was monitored for the duration of the treatment. Birds were slaughtered using a low atmospheric pressure method of the instant disclosure, and the birds' behavior during slaughter was observed. Four runs were performed. The lapse time to various decompression pressures during slaughter, as well as the average lapse time to each decompression pressure, are set forth in Table 1. A chart depicting the average vacuum pressure versus corresponding lapse time is set forth in FIG. 1.

TABLE 1

Vacuum (inHg gauge)

| | 0 | 5 | 10 | 15 | 20 | 21 | 22 | 23 | 23.5 |
|---|---|---|---|---|---|---|---|---|---|
| Run 1 Lapse Time (sec) | 0 | 9 | 21 | 43 | 78 | 110 | 166 | 220 | 265 |
| Run 2 Lapse Time (sec) | 0 | 9 | 24 | 44 | 82 | 130 | 184 | 246 | 270 |
| Run 3 Lapse Time (sec) | 0 | 9 | 24 | 42 | 74 | 120 | 169 | 238 | 273 |
| Run 4 Lapse Time (sec) | 0 | 9 | 24 | 45 | 83 | 127 | 185 | 246 | 274 |
| Average Lapse Time (sec) | 0 | 9 | 23.25 | 43.5 | 79.25 | 121.75 | 176 | 237.5 | 270.5 |

General observations of slaughter under the various treatment conditions were as follows. At the onset of decompression, most birds were in the sitting position. Some birds would stand as soon as air started exiting the chamber. Within a few seconds, some birds would exhibit one or two head shakes, defecate, raise their contour feathers; all birds became ataxic, and then lost postural balance and became recumbent on the floor of the cage, either lying on their sides or backs. At this stage, flapping of the wings began by some birds accompanied by a low, guttural moaning in all runs.

Figure 2:
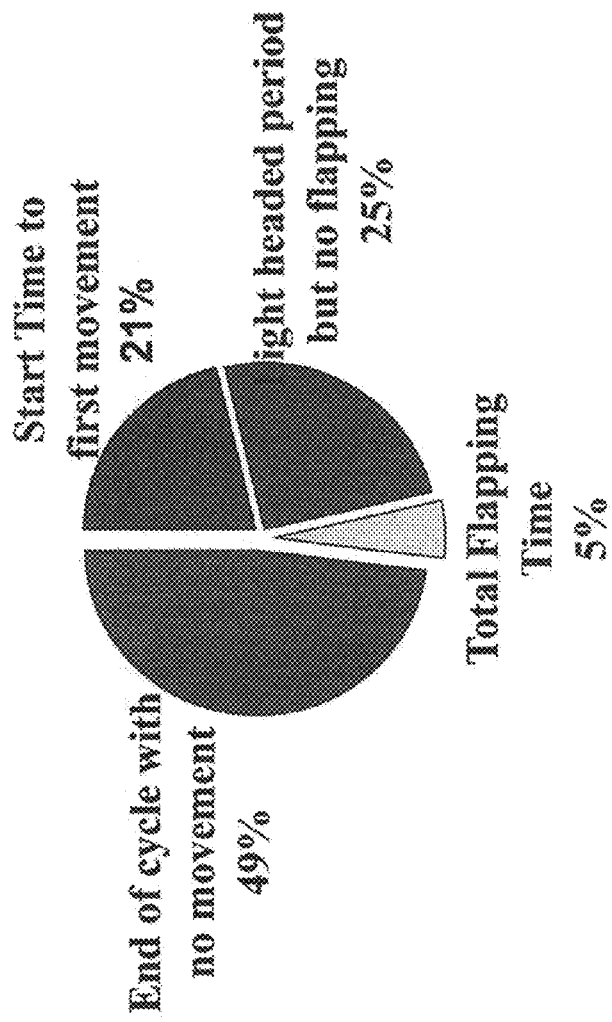
FIG. 2 is a chart depicting the activity of broilers in a low atmospheric pressure system chamber, as discussed in Example 1.

On average, the time period from initial decompression to the time of first movement of the birds (i.e., stand up or sit down) was about 21% of the total lapse time. The time period over which the birds experienced light headedness, but no flapping (i.e., the time between the bird's first movement and the beginning of wing flap), was about 25% of the total lapse time. Further, on average, the birds experienced wing flapping for a total time period of about 5% of the total lapse time. On average, the period of time during which the birds experienced no movement was about 49% of the total lapse time. These results are shown in FIG. 2.

Example 2

Bird Behavior During Slaughter

In this example, the behavior of birds slaughtered using low atmospheric pressure curves according to the instant disclosure was evaluated.

Figure 3:
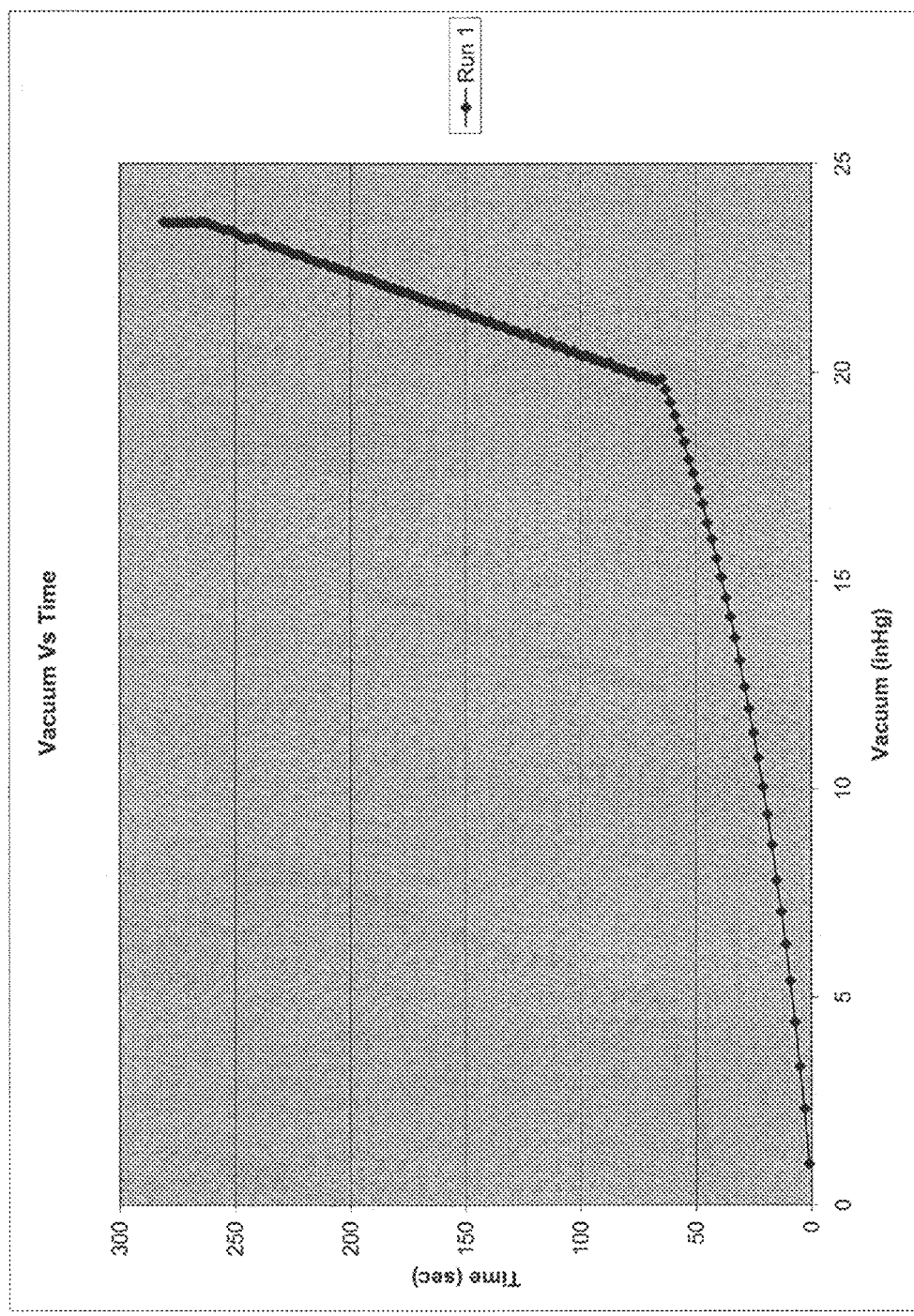
FIG. 3 is a chart depicting the vacuum pressure versus lapse time for Run 1 of the low atmospheric pressure slaughter, as discussed in Example 2.
Figure 4:
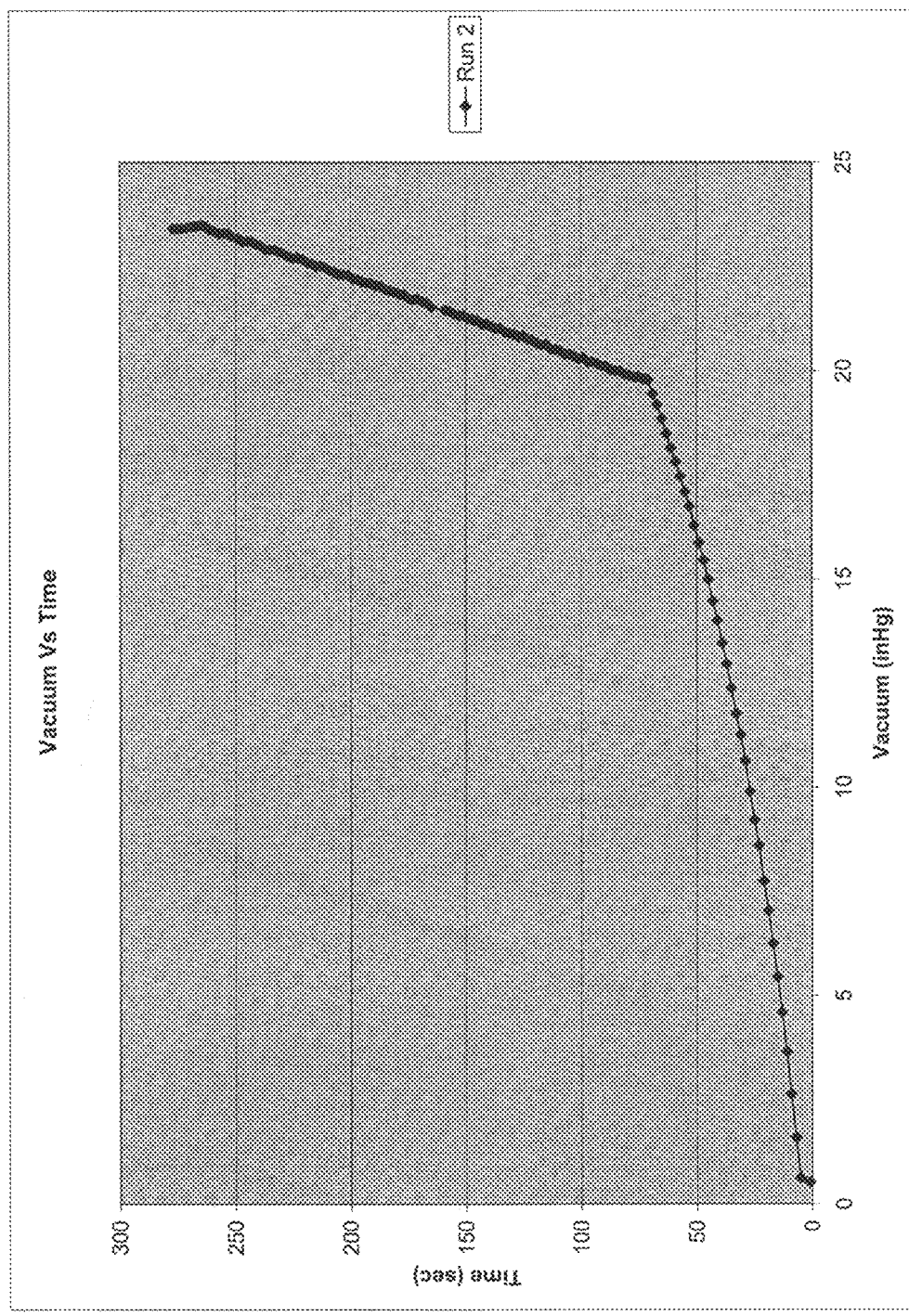
FIG. 4 is a chart depicting the vacuum pressure versus lapse time for Run 2 of the low atmospheric pressure slaughter, as discussed in Example 2.

Broilers were loaded into a decompression chamber as described in Example 1. Birds were slaughtered using low atmospheric pressure methods of the instant disclosure, and the birds' behavior during slaughter was observed. Two runs were performed (270 birds per run). Charts depicting the vacuum pressure versus corresponding lapse time for Runs 1 and 2 are set forth in FIGS. 3 and 4, respectively. The lapse time to various decompression pressures during slaughter for each run are set forth in Table 2.

TABLE 2

| Run 1 | | Run 2 | |
|---|---|---|---|
| Vacuum (inHg gauge) | Lapse Time (sec) | Vacuum (inHg gauge) | Lapse Time (sec) |
| 5.4 | 9 | 5.5 | 15 |
| 10.1 | 21 | 10.0 | 27 |
| 15.1 | 39 | 15.0 | 45 |
| 20.0 | 77 | 20.0 | 83 |
| 20.1 | 83 | 20.1 | 89 |
| 20.3 | 93 | 20.3 | 99 |
| 20.5 | 103 | 20.5 | 111 |
| 20.7 | 113 | 20.7 | 119 |
| 20.9 | 123 | 20.9 | 129 |
| 21.0 | 131 | 21.0 | 135 |
| 21.1 | 133 | 21.1 | 139 |
| 21.3 | 143 | 21.3 | 149 |
| 21.5 | 153 | 21.5 | 159 |
| 21.7 | 165 | 21.7 | 169 |
| 21.9 | 173 | 21.9 | 181 |
| 22.0 | 181 | 22.0 | 185 |
| 22.1 | 185 | 22.1 | 191 |
| 22.3 | 195 | 22.3 | 201 |
| 22.5 | 205 | 22.5 | 211 |
| 22.7 | 215 | 22.7 | 221 |
| 22.9 | 227 | 22.9 | 231 |
| 23.0 | 231 | 23.0 | 239 |
| 23.1 | 237 | 23.1 | 243 |
| 23.3 | 249 | 23.3 | 253 |
| 23.5 | 259 | 23.5 | 265 |

For each of Runs 1 and 2, the pressure was lowered at an average rate of about 0.5 inHg/26 seconds between the decompression pressures of 20 inHg and 23.5 inHg. Once a decompression pressure of about 23.5 inHg was established, the runs were continued for about another 22 seconds (Run 1) or about another 12 seconds (Run 2), during which time the poultry achieved a state of death. As can be seen from FIGS. 3 and 4, following establishment of a decompression pressure of about 23.5 inHg, the rate of decompression significantly tapered off for the remainder of the runs.

The bird behavior during slaughter for Runs 1 and 2 was the same as that observed in Example 1. Specifically, on average, the time period from initial decompression to the time of first movement of the birds (i.e., stand up or sit down) was about 21% of the total lapse time. The time period over which the birds experienced light headedness, but no flapping (i.e., the time between the bird's first movement and the beginning of wing flap), was about 25% of the total lapse time. Further, on average, the birds experienced wing flapping for a total time period of about 5% of the total lapse time. On average, the period of time during which the birds experienced no movement was about 49% of the total lapse time.

Example 3

Bird Behavior During Slaughter

In this example, the behavior of birds slaughtered using a low atmospheric pressure curve according to the instant disclosure was evaluated.

Broilers were loaded into a decompression chamber as described in Example 1. The pressure was lowered at a continuous rate to a target decompression pressure of about 23.5 inHg over 286 seconds (lapse time). Between the decompression pressures of 20 inHg and 23.5 inHg, the pressure was lowered at a rate of about 0.5 inHg/28 seconds. Ten runs were performed (four birds per run). The behavior of the birds during each run was observed, and the results are shown in Table 3.

TABLE 3

| Run (4 birds per run) | Time to first movement* | Time to light headed** | Bouts of flapping | Total flap time |
|---|---|---|---|---|
| 1 | 52 | 96 | 3.25 | 17.75 |
| 2 | 53.25 | 96.5 | 2.25 | 15.25 |
| 3 | 70.667 | 38.667 | 2.333 | 14.667 |
| 4 | 64 | 90 | 2 | 13.333 |
| 5 | 66 | 83.667 | 2.667 | 13.667 |
| 6 | 71.25 | 65 | 2.25 | 12.75 |
| 7 | 56.33 | 29.667 | 4.333 | 16.333 |
| 8 | 42 | 66 | 3.333 | 15.33 |
| 9 | 71.667 | 80.667 | 2 | 14.667 |
| 10 | 41 | 47 | 3.333 | 17.333 |
| Average | 58.7164 | 69.3168 | 2.7749 | 15.108 |

*First coordinated movement - Stand up or sit down
**First movement to first flap Under the slaughter conditions set forth above, the average lapse time to first coordinated movement of the birds was about 58.72 seconds. The first coordinated movement occurred at decompression pressures ranging from about 12 inHg to about 20 inHg. The time between the birds' first coordinated movement and the beginning of wing flap (i.e., period of light headedness) was on average about 69.32 seconds. The average total wing flap time for the ten runs was about 15.12 seconds, with the birds experiencing an average of about 2.77 bouts of wing flapping per run. Wing flap occurred at a decompression pressure of from about 20 inHg to about 23.25 inHg. On average, the total period of time during which the birds were moving during the slaughter was about 143.14 seconds.

As can be seen from these results, total average wing flap time for the birds was only about 5.3% of the total lapse time. The wing flap for birds slaughtered using the low atmospheric pressure method of the instant disclosure is thus less than the wing flap for birds slaughtered using other methods, such as unloading and shackling a bird when the bird is conscious and stunning the bird using the electrical shock method.

Example 4

Effect of Pressure Curve on Wing Damage

In this example, the incidence of wing damage in birds killed by low atmospheric pressure using two different pressure curves was compared.

To begin, broilers at 52 to 59 days of age were killed by low atmospheric pressure slaughter using either the pressures and average lapse times set forth in Example 1, Table 1 (25,000 birds—Curve A), or using a different pressure curve (6,500 birds—Curve B). In particular, birds were placed into cages (300 birds per cage), and the cages containing the birds were individually placed into the decompression chamber described in the Test Methods section. For birds slaughtered using Curve B, the pressure in the chamber was lowered to 25 inHg gauge pressure over 67 seconds (lapse time), and the low pressure was maintained for 30 seconds (hold time). Following slaughter, the birds in each group were evaluated for incidence of broken and damaged (e.g., bruised) wings. The cumulative results for all birds are shown in FIG. 5.

Figure 5:
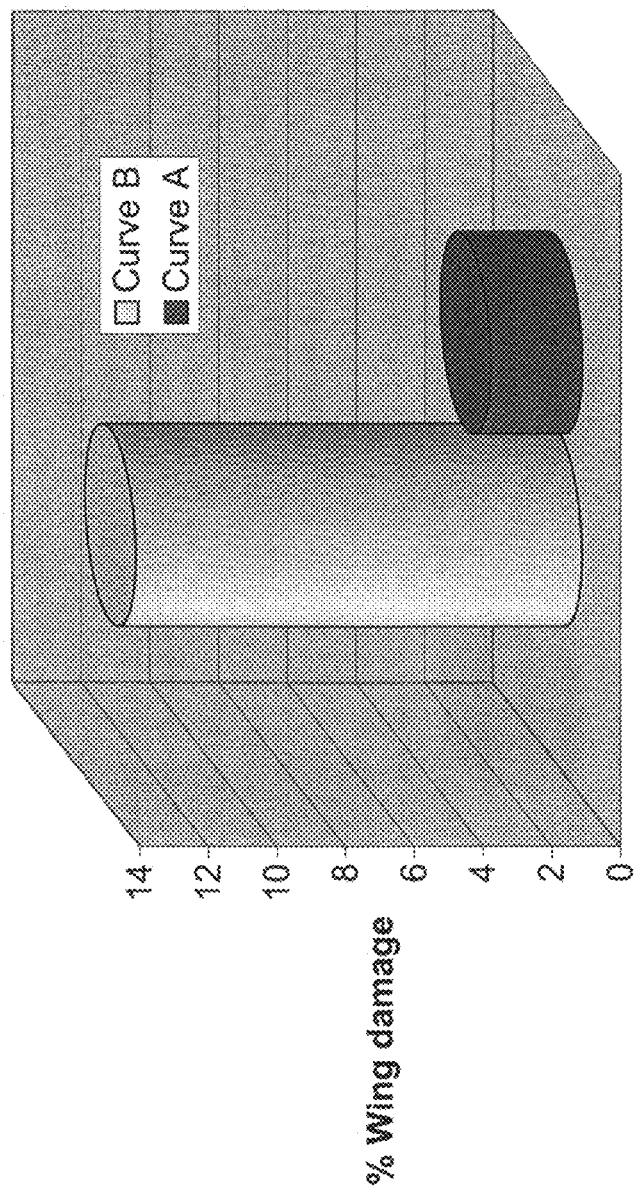
FIG. 5 is a chart comparing the effect of two different low atmospheric slaughter methods on wing damage, as discussed in Example 4.

As can be seen from FIG. 5, birds slaughtered using low atmospheric pressure and a pressure curve of the present disclosure (Curve A) had a significantly lower percentage of wing damage than birds slaughtered using Curve B. These results demonstrate that the low atmospheric pressure slaughter methods of the present disclosure result in less wing damage and thus improved meat quality as compared to other low atmospheric slaughter methods.

What is claimed is:

1. A method for decreasing spastic wing activity during the slaughter of poultry, the method comprising:
   enclosing the poultry in a sealed chamber; and
   decompressing the chamber at a continuous rate to a target decompression pressure of from about 23.5 inHg gauge pressure to about 27 inHg gauge pressure as measured at mean sea level,
   wherein lapse time to a decompression pressure of about 20 inHg gauge pressure is about 85 seconds or less, and wherein over a decompression pressure range of from about 20 inHg gauge pressure to about 23.5 inHg gauge pressure, pressure in the chamber decreases at a rate of from about 0.5 inHg gauge pressure/15 seconds to about 0.5 inHg gauge pressure/45 seconds.

2. The method of claim 1, wherein over the decompression pressure range of from about 20 inHg gauge pressure to about 23.5 inHg gauge pressure, the rate of pressure decrease in the chamber is from about 0.5 inHg gauge pressure/20 seconds to about 0.5 inHg gauge pressure/35 seconds.

3. The method of claim 1, wherein lapse time to about 20 inHg gauge pressure is from about 70 seconds to about 85 seconds.

4. The method of claim 3, wherein lapse time to about 20 inHg gauge pressure is from about 79 seconds to about 83 seconds.

5. The method of claim 1, wherein lapse time to about 21 inHg gauge pressure is from about 110 seconds to about 135 seconds.

6. The method of claim 5, wherein lapse time to about 21 inHg gauge pressure is from about 131 seconds to about 135 seconds.

7. The method of claim 5, wherein lapse time to about 21 inHg gauge pressure is about 122 seconds.

8. The method of claim 1, wherein lapse time to about 22 inHg gauge pressure is from about 165 seconds to about 185 seconds.

9. The method of claim 8, wherein lapse time to about 22 inHg gauge pressure is about 181 seconds.

10. The method of claim 1, wherein lapse time to about 23 inHg gauge pressure is from about 220 seconds to about 250 seconds.

11. The method of claim 10, wherein lapse time to about 23 inHg gauge pressure is about 235 seconds.

12. The method of claim 1, wherein lapse time to about 23.5 inHg gauge pressure is from about 255 seconds to about 275 seconds.

13. The method of claim 12, wherein lapse time to about 23.5 inHg gauge pressure is from about 259 seconds to about 269 seconds.

14. The method of claim 1, wherein the target decompression pressure is from about 23.5 inHg gauge pressure to about 25 inHg gauge pressure.

15. The method of claim 14, wherein the target decompression pressure is about 23.5 inHg gauge pressure.

16. A method for decreasing spastic wing activity during the slaughter of poultry, the method comprising:
   enclosing the poultry in a sealed chamber; and
   decompressing the chamber at a continuous rate to a target decompression pressure of from about 23.5 inHg gauge pressure to about 27 inHg gauge pressure as measured at mean sea level,
   wherein:
   lapse time to a decompression pressure of about 20 inHg gauge pressure is from about 70 seconds to about 85 seconds, lapse time to a decompression pressure of about 21 inHg gauge pressure is from about 110 seconds to about 135 seconds, lapse time to a decompression pressure of about 22 inHg gauge pressure is from about 165 seconds to about 185 seconds, lapse time to a decompression pressure of about 23 inHg gauge pressure is from about 220 seconds to about 250 seconds, and lapse time to a decompression pressure of about 23.5 inHg gauge pressure is from about 255 seconds to about 275 seconds.

17. The method of claim 16, wherein:

lapse time to the decompression pressure of about 20 inHg gauge pressure is about 79 seconds, lapse time to the decompression pressure of about 21 inHg gauge pressure is about 122 seconds, lapse time to the decompression pressure of about 22 inHg gauge pressure is about 176 seconds, lapse time to the decompression pressure of about 23 inHg gauge pressure is about 238 seconds, and lapse time to the decompression pressure of about 23.5 inHg gauge pressure is about 271 seconds.

18. The method of claim 16, wherein the target decompression pressure is from about 23.5 inHg gauge pressure to about 25 inHg gauge pressure.

19. The method of claim 18, wherein the target decompression pressure is about 23.5 inHg gauge pressure.

* * * * *